US006457139B1

(12) United States Patent
D'Errico et al.

(10) Patent No.: US 6,457,139 B1
(45) Date of Patent: Sep. 24, 2002

(54) METHOD AND APPARATUS FOR PROVIDING A HOST COMPUTER WITH INFORMATION RELATING TO THE MAPPING OF LOGICAL VOLUMES WITHIN AN INTELLIGENT STORAGE SYSTEM

(75) Inventors: Matthew J. D'Errico, Southboro, MA (US); Steven M. Blumenau, Holliston, MA (US); Erez Ofer, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/223,126

(22) Filed: Dec. 30, 1998

(51) Int. Cl.[7] ................................................. G06F 1/00
(52) U.S. Cl. ................................ 714/5; 714/7; 710/10; 710/15; 710/305; 710/311
(58) Field of Search ...................... 714/5–7, 41, 42–47; 711/112–114; 710/15–21, 33–35, 72–74, 128–129, 305, 306, 311, 313, 10

(56) References Cited

U.S. PATENT DOCUMENTS

| | | | | |
|---|---|---|---|---|
| 5,546,557 A | * | 8/1996 | Allen et al. ................. | 711/112 |
| 5,581,724 A | * | 12/1996 | Belsan et al. ............... | 711/111 |
| 5,897,661 A | * | 4/1999 | Baranovsky et al. ........ | 711/170 |
| 5,983,316 A | * | 11/1999 | Norwood .................... | 711/112 |
| 6,055,602 A | * | 4/2000 | McIlvain et al. ........... | 711/112 |
| 6,148,369 A | * | 11/2000 | Ofer et al. .................. | 711/114 |
| 6,154,854 A | * | 11/2000 | Stallmo ....................... | 711/6 |
| 6,209,059 B1 | * | 3/2001 | Ofer et al. .................. | 711/114 |
| 6,216,202 B1 | * | 4/2001 | D'Errico ..................... | 711/112 |
| 6,341,317 B1 | * | 1/2002 | D'Errico et al. ............. | 710/15 |

* cited by examiner

*Primary Examiner*—Peter Wong
*Assistant Examiner*—Raymond N Phan
(74) *Attorney, Agent, or Firm*—Wolf, Greenfield & Sacks, P.C.

(57) ABSTRACT

Method and apparatus directed to a computer system including a host computer and an intelligent storage system that stores data accessed by the host computer, the computer system including a plurality of logical volumes of data that are visible to the host computer and the storage system and that are perceived by the host computer as comprising a plurality of raw storage devices, the storage system including a plurality of physical storage devices and at least one mapping layer that maps the plurality of logical volumes to the plurality of physical storage devices so that the data in each of the plurality of logical volumes is stored on at least one of the plurality of physical storage devices. One aspect of the invention is directed to providing the host computer with information identifying, for at least one of the plurality of logical volumes, which ones of the plurality of physical storage devices store data included in the at least one of the plurality of logical volumes. The host computer can use this information in configuring data blocks among the plurality of logical volumes.

56 Claims, 5 Drawing Sheets

METHOD AND APPARATUS FOR PROVIDING A HOST COMPUTER WITH INFORMATION RELATING TO THE MAPPING OF LOGICAL VOLUMES WITHIN AN INTELLIGENT STORAGE SYSTEM

FIELD OF THE INVENTION

The present invention is directed to a method and apparatus for providing a host computer with information relating to the mapping of logical volumes within an intelligent storage system.

DESCRIPTION OF THE RELATED ART

Figure 1:
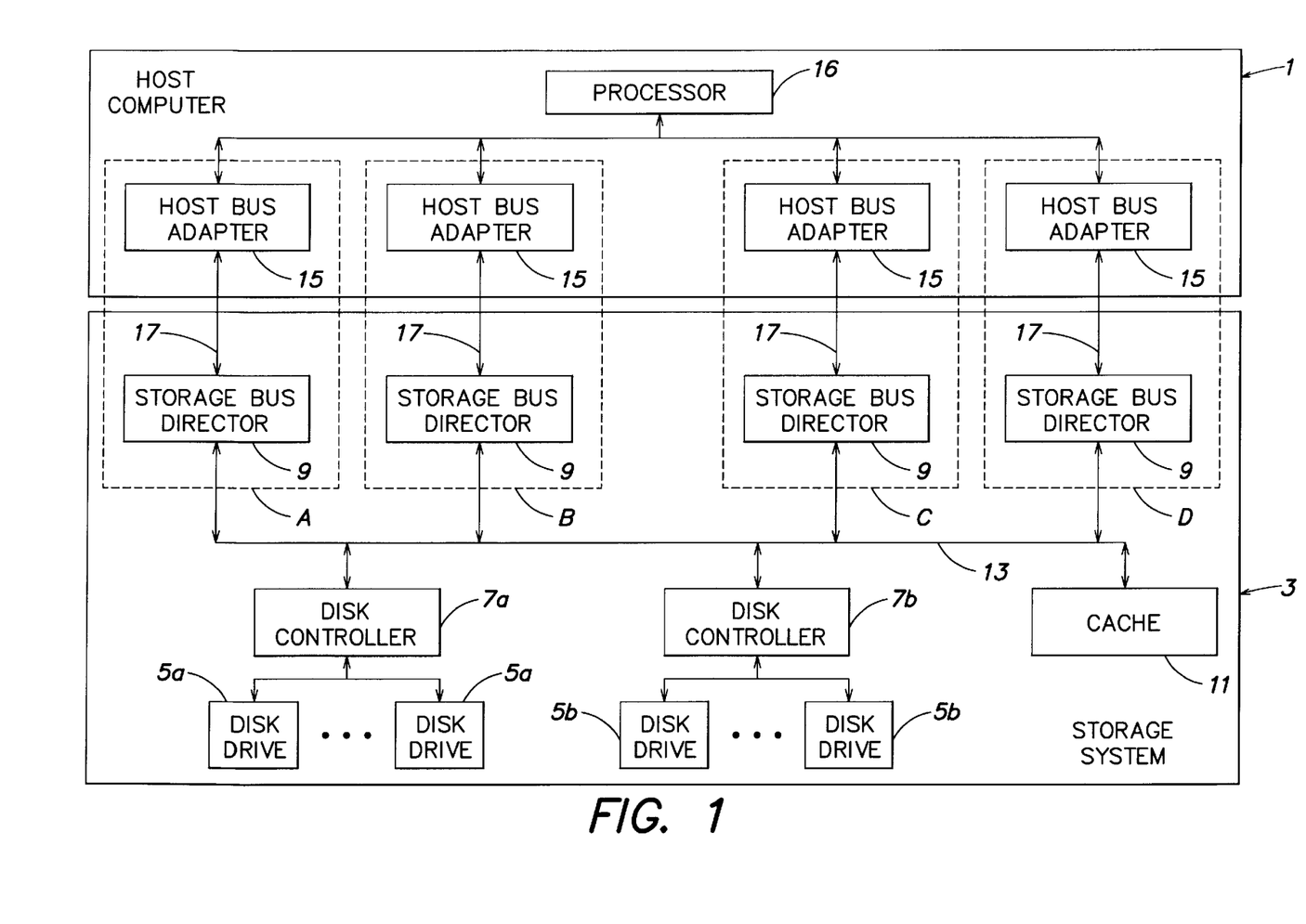
FIG. 1 is a block diagram of an exemplary multi-path computing system on which aspects of the present invention can be implemented.

Many computer systems include one or more host computers and one or more storage systems that store data used by the host computers. An example of such a system is shown in FIG. 1, and includes a host computer 1 and a storage system 3. The storage system typically includes a plurality of storage devices on which data is stored. In the exemplary system shown in FIG. 1, the storage system includes a plurality of disk drives 5a–5b, and a plurality of disk controllers 7a–7b that respectively control access to the disk drives 5a and 5b. The storage system 3 further includes a plurality of storage bus directors 9 that control communication with the host computer 1 over communication buses 17. The storage system 3 further includes a cache 11 to provide improved storage system performance. In particular, when the host computer 1 executes a read from the storage system 3, the storage system 3 may service the read from the cache 11 (when the data is stored in the cache), rather than from one of the disk drives 5a–5b, to execute the read more efficiently. Similarly, when the host computer 1 executes a write to the storage system 3, the corresponding storage bus director 9 can execute the write to the cache 11. Thereafter, the write can be destaged asynchronously, in a manner transparent to the host computer 1, to the appropriate one of the disk drives 5a–5b. Finally, the storage system 3 includes an internal bus 13 over which the storage bus directors 9, disk controllers 7a–7b and the cache 11 communicate.

The host computer 1 includes a processor 16 and one or more host bus adapters 15 that each controls communication between the processor 16 and the storage system 3 via a corresponding one of the communication buses 17. It should be appreciated that rather than a single processor 16, the host computer 1 can include multiple processors. Each bus 17 can be any of a number of different types of communication links, with the host bus adapter 15 and the storage bus directors 9 being adapted to communicate using an appropriate protocol for the communication bus 17 coupled therebetween. For example, each of the communication buses 17 can be implemented as a SCSI bus, with the directors 9 and adapters 15 each including a SCSI driver. Alternatively, communication between the host computer 1 and the storage system 3 can be performed over a Fibre Channel fabric that implements the communication bus 17.

As shown in the exemplary system of FIG. 1, some computer systems employ multiple paths A–D for communicating between the host computer 1 and the storage system 3 (e.g., each path includes a host bus adapter 15, a bus 17 and a storage bus director 9 in FIG. 1). In many such systems, each of the host bus adapters 15 has the ability to access each of the disk drives 5a–5b, through the appropriate storage bus director 9 and disk controller 7a–b.

Figure 2:
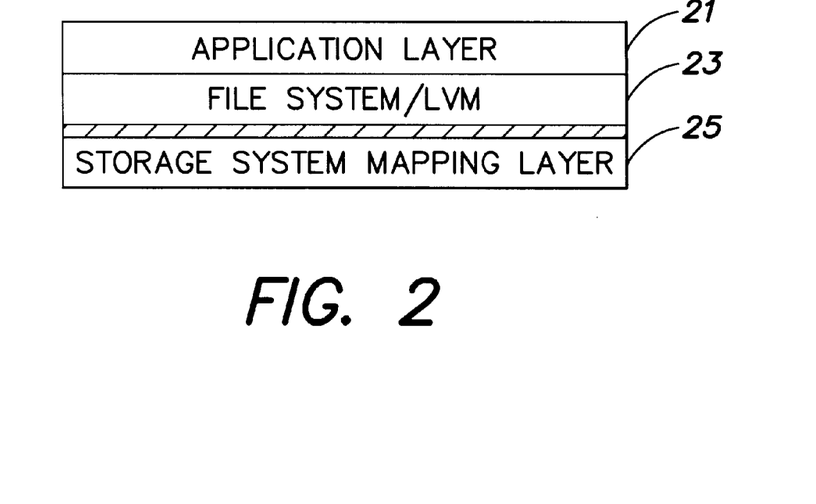
FIG. 2 is a schematic representation of a number of mapping layers that exist in known computing system such as that disclosed in FIG. 1.

The storage system 3 disclosed in FIG. 1 is an intelligent storage system that controls the location wherein data accessible via the host computer 1 is stored. Thus, the exact physical location (i.e., which one of the disk drives 5a–5b and the location on the disk drive) wherein any block of data is actually stored is transparent to the host computer 1. In this respect, a computer system such as that shown in FIG. 1 typically includes a plurality of layers as shown in FIG. 2. The layers include an application layer 21 that resides on the host computer 1 and references data objects (e.g., files) used by the application. In addition, the host computer 1 also includes a file system and/or logical volume manager layer 23 that maps each data object specified by the application layer 21 to a particular logical volume, that the host computer 1 perceives to correspond to an actual physical storage device, wherein the data object is stored. Thus, if the computer system included a storage system without any intelligence, the logical volumes specified by the file system/LVM layer 23 would designate a particular physical device and a particular storage location thereon wherein the data object would be stored. Finally, the computer system further includes a storage system mapping layer 25 that resides on the storage system, and that maps from the logical volume provided from layer 23 to an actual physical location, including at least one of the disk drives 5a–5b and the physical location thereon, wherein the logical volume is stored. The mapping between a logical volume and a physical disk drive may not be 1:1, as a single logical volume can be split across multiple physical disk drives 5a–5b, or alternatively, multiple logical volumes can be stored on the same physical disk drive.

It is an object of the present invention to provide an improved method and apparatus for managing the placement of data on a storage system to achieve improved system performance.

SUMMARY OF THE INVENTION

One illustrative embodiment of the invention is directed to a method in a computer system including a host computer and an intelligent storage system that is coupled to the host computer and stores data accessed by the host computer, the computer system including a plurality of logical volumes of data that are visible to the host computer and the storage system and that are perceived by the host computer as comprising a plurality of raw storage devices, the storage system including a plurality of physical storage devices and at least one mapping layer that maps the plurality of logical volumes to the plurality of physical storage devices so that the data in each of the plurality of logical volumes is stored on at least one of the plurality of physical storage devices. The method comprises a step of providing the host computer with information identifying, for at least one of the plurality of logical volumes, which ones of the plurality of physical storage devices store data included in the at least one of the plurality of logical volumes.

Another illustrative embodiment of the invention is directed to a computer readable medium encoded with a program for execution on a computer system including a host computer and an intelligent storage system that is coupled to the host computer and stores data accessed by the host computer, the computer system further including a plurality of logical volumes of data that are visible to the host computer and the intelligent storage system and that are perceived by the host computer as comprising a plurality of raw storage devices, the storage system including a plurality of physical storage devices and at least one mapping layer that maps the plurality of logical volumes to the plurality of physical storage devices so that the data in each of the plurality of logical volumes is stored on at least one of the plurality of physical storage devices. The program, when executed on the computer system, performing a method comprising a step of providing the host computer with information identifying, for at least one of the plurality of logical volumes, which ones of the plurality of physical storage devices store data included in the at least one of the plurality of logical volumes.

A further illustrative embodiment of the invention is directed to a computer readable medium encoded with a program for execution on a computer system including a host computer and an intelligent storage system that is coupled to the host computer and stores data accessed by the host computer, the computer system further including a plurality of logical volumes of data that are visible to the host computer and the intelligent storage system and that are perceived by the host computer as comprising a plurality of raw storage devices, the storage system including a plurality of physical storage devices and at least one mapping layer that maps the plurality of logical volumes to the plurality of physical storage devices so that the data in each of the plurality of logical volumes is stored on at least one of the plurality of physical storage devices. The program, when executed on the host computer, performing a method comprising a step of receiving information from the storage system identifying, for at least one of the plurality of logical volumes, which ones of the plurality of physical storage devices store data included in the at least one of the plurality of logical volumes.

Another illustrative embodiment of the invention is directed to an intelligent storage system for use in a computer system including a host computer and the intelligent storage system to store data accessed by the host computer, the computer system including a plurality of logical volumes of data that are visible to the host computer and the storage system and that are perceived by the host computer as comprising a plurality of raw storage devices. The storage system comprises a plurality of physical storage devices; at least one mapping layer that maps the plurality of logical volumes to the plurality of physical storage devices so that the data in each of the plurality of logical volumes is stored on at least one of the plurality of physical storage devices; and at least one controller to provide the host computer with information identifying, for at least one of the plurality of logical volumes, which ones of the plurality of physical storage devices store data included in the at least one of the plurality of logical volumes.

A further illustrative embodiment of the invention is directed to a host computer for use in a computer system including the host computer and an intelligent storage system that is coupled to the host computer and stores data accessed by the host computer, the computer system including a plurality of logical volumes of data that are visible to the host computer and the storage system and that are perceived by the host computer as comprising a plurality of raw storage devices, the storage system including plurality of storage devices and at least one mapping layer that maps the plurality of logical volumes to the plurality of physical storage devices so that the data in each of the plurality of logical volumes is stored on at least one of the plurality of physical storage devices. The host computer comprises at least one controller to receive information from the storage system identifying, for at least one of the plurality of logical volumes, which ones of the plurality of physical storage devices store data included in the at least one of the plurality of logical volumes.

DETAILED DESCRIPTION

Reconfiguring Data within a Single Storage System

In accordance with one illustrative embodiment of the present invention, an improved method and apparatus is provided for managing the placement of data on a storage system to achieve improved system performance. In one embodiment of the invention, this management process is transparent to the host computer, such that the host computer and any application running thereon need not be modified in any way to achieve the performance benefits provided by this aspect of the present invention. Rather, when data objects are created for an application running in the application layer 21 (FIG. 2) on the host computer 1 (FIG. 1), the file system/LVM layer 23 can simply create logical volumes of the appropriate size, and need not give any consideration to where those logical volumes should be placed within the storage system 3 to maximize system performance, as that placement is managed internally by the storage system 3.

In the examples discussed below, the aspects of the present invention are employed with a storage system such as that disclosed in FIG. 1 that includes a plurality of disk drives. However, it should be appreciated that the present invention is not limited in this respect. The present invention can be employed with any type of storage system (e.g., tape drives, etc.), and is not limited to use with a disk drive storage system.

One illustrative example of the manner in which the placement of data can be managed on the storage system 3 in accordance with one embodiment of the present invention relates to the management of hot spots. Hot spots are contiguous areas in a storage system that are accessed with great frequency. Conventional thinking suggests that hot spots are disadvantageous because they negatively impact system performance. In particular, the conventional thinking is that hot spots will typically result in a number of consecutive operations each directed to a single one of the disk drives 5a–5b (FIG. 1). Since only one operation can be directed to a particular disk drive at a time, conventional thinking has taught that hot spots reduced system performance because consecutive I/O operations between the host computer 1 and the storage system 3 would have to be performed serially, rather than achieving parallel access to multiple ones of the disk drives 5a–5b simultaneously. Thus, conventional thinking has taught that hot spots should be avoided and/or broken up in a storage system so that repeated is frequent accesses are not directed to a contiguous storage area in the storage system 3. Therefore, when a hot spot was detected in some conventional systems, the data would be unloaded from the storage system 3 and then reloaded thereon in a different configuration in an attempt to break up the hot spot. This was typically done mechanically, and under the control of the host computer 1 (FIG. 1). In addition, conventional systems did not detect a hot spot automatically, such that mechanical intervention (e.g., by a system administrator) was required to detect a hot spot condition and take the desired action to split it up.

Applicants have discovered that the conventional thinking concerning hot spots is inaccurate when dealing with a cached storage system such as that shown in FIG. 1. In particular, since hot spots will be frequently accessed, the likelihood is great that the hot spot will remain in the cache 11 of the storage system, thereby enabling the storage system to achieve a high level of performance for repeated frequent accesses to the hot spot. Thus, contrary to conventional thinking, Applicants have determined that rather than breaking up hot spots, it is desirable in a cached storage system to keep hot spots intact to maximize system performance.

Figure 3:
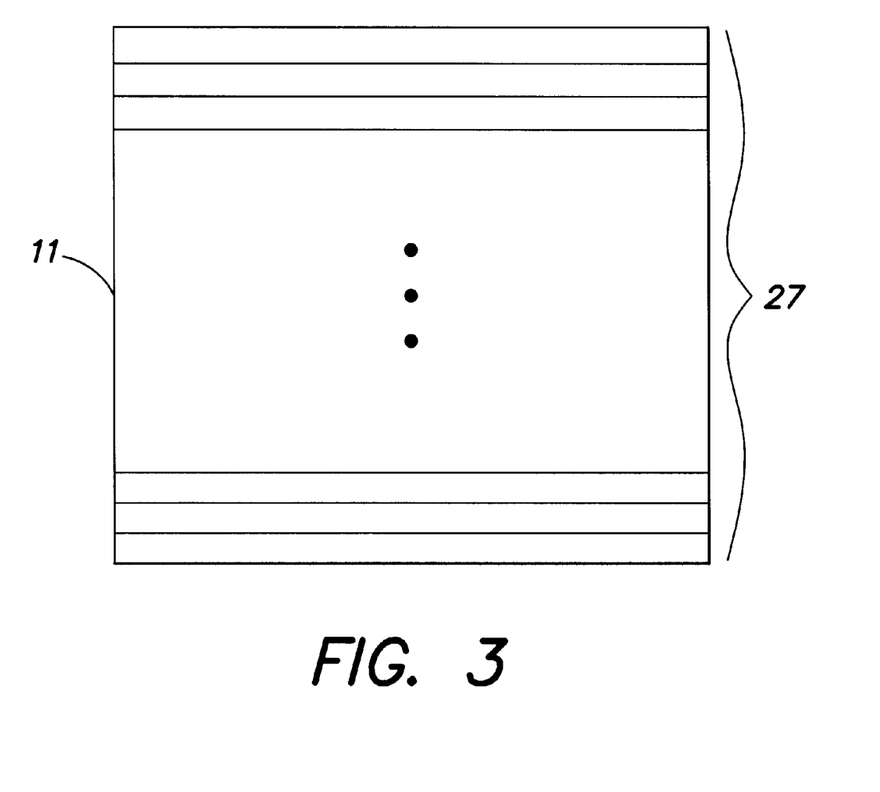
FIG. 3 is a schematic representation of a cache such as that shown in FIG. 1, including a plurality of slots.

Despite the advantages discussed above, Applicants also have discovered that there is a maximum size that a hot spot should not exceed, or system performance will degrade. For example, it should be appreciated that the cache 11 in a cached storage system such as that shown in FIG. 1 typically is subdivided into a plurality of storage locations or cache slots 27 as shown in FIG. 3. The cache 11 typically allocates a limited number of slots 27 to any particular logical volume. The number of assigned slots is generally not sufficiently large to enable an entire logical volume to be stored within the cache 11. Thus, when a portion of a logical volume is accessed that does not reside in the cache 11, some portion of the data within the cache slots 27 allocated to that logical volume are swapped out of the cache to make room for the newly accessed portion of the logical volume.

Figure 4A:
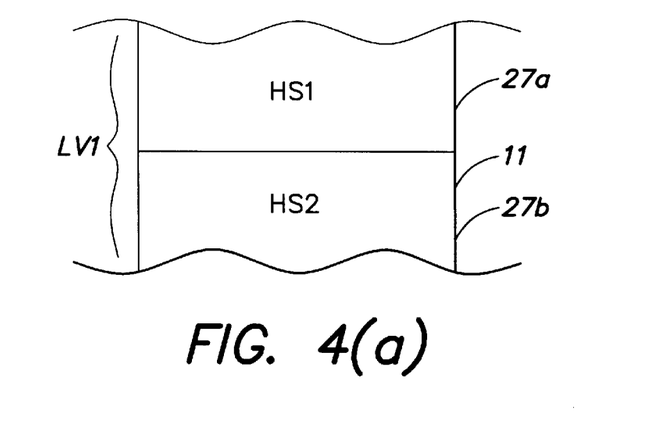
FIGS. 4(a)–4(b) are schematic representations of the overflowing of cache slots dedicated to a particular logical volume that includes a hot spot.
Figure 4B:
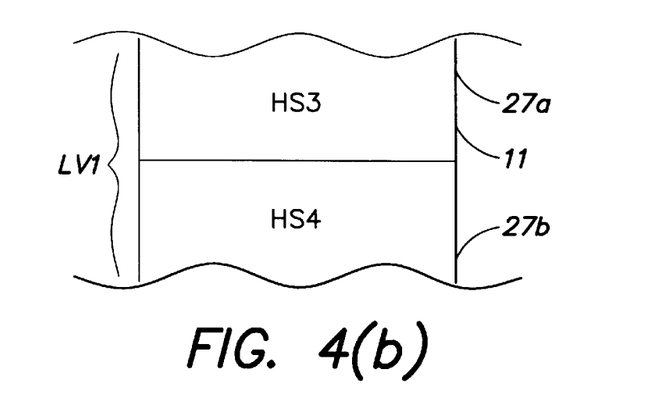

As should be appreciated from the foregoing, if a logical volume includes a hot spot that is larger than the space that the cache 11 allocates for that logical volume, the relevant slots of the cache 11 will overflow each time the hot spot is accessed, which by the very definition of a hot spot, will occur frequently. Thus, data that will be needed repeatedly will constantly be swapped out of the cache 11, resulting in repeated cache misses that will degrade system performance. An example of this is shown in FIGS. 4(a)–4(b), which conceptually illustrate a pair of cache slots 27a and 27b that are allocated to a particular logical volume LV1. It should be appreciated that this example is provided merely for illustrative purposes, and that the number of cache slots allocated to a logical volume will typically be far greater than two. Within logical volume LV1 is a hot spot including sufficient data to fill four cache slots, with the four slots worth of data being respectively labeled as HS1–HS4 in FIGS. 4(a)–4(b). Each time the hot spot is accessed, the first two slots worth of data HS1 and HS2 will be loaded into the cache slots 27a and 27b, respectively. Thereafter, that data will be swapped out of those cache slots and replaced by HS3 and HS4 to complete the access to the hot spot. Thus, as the hot spot is repeatedly accessed, the slots 27a and 27b will continually overflow, requiring that the data included in the hot spot be repeatedly accessed from the relevant ones of the disk drives 5a–5b (FIG. 1), thereby achieving little, if any, performance benefits from the use of the cache 11.

In accordance with one illustrative embodiment of the present invention, accesses to a hot spot within a logical volume are monitored to determine if the hot spot overflows the amount of cache storage designated for the logical volume, and when such an overflow condition is detected, the hot spot is split between two or more logical volumes to avoid overflowing of the cache. As discussed in more detail below, the logical volume including the hot spot can be split in any of numerous ways, and the present invention is not limited to any particular splitting technique.

Figure 5:
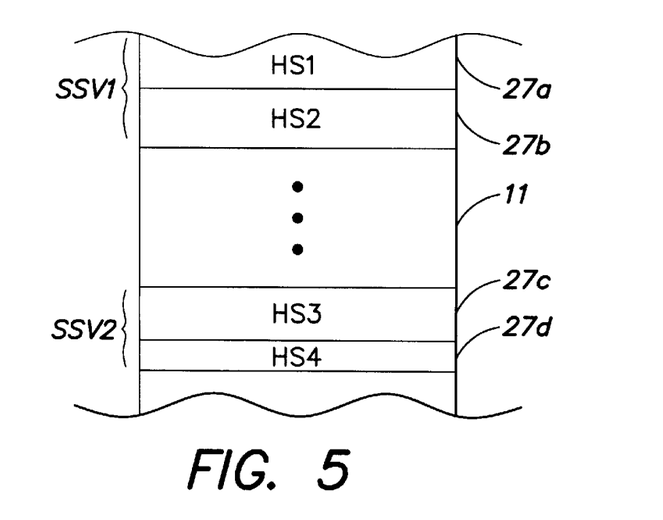
FIG. 5 is a schematic representation of a cache including the splitting of a hot spot in accordance with one illustrative embodiment of the present invention.

The splitting of the hot spot is shown conceptually in FIG. 5, wherein the portions HS1 and HS2 of the hot spot are included in a first storage system volume SSV1 having a pair of cache slots 27a, 27b dedicated thereto, and the portions HS3 and HS4 of the hot spot are included in a second storage system volume SSV2 having a pair of cache slots 27c, 27d dedicated thereto. The relationship between the storage system volumes SSV1, SSV2 and the logical volume LV1 will be explained below. As represented in FIG. 5, by splitting the hot spot between two storage system volumes SSV1 and SSV2 having different sets of dedicated cache slots, as the hot spot is repeatedly accessed, the cache 11 does not overflow because the portions of the hot spot HS1 and HS2 remain in the slots 27a and 27b dedicated to storage system volume SSV1, and the portions of the hot spot HS3 and HS4 remain in the cache slots 27c and 27d dedicated to the storage system volume SSV2. Thus, as the hot spot is repeatedly accessed, all portions thereof remain in the cache 11, thereby enabling the storage system 3 to achieve a high performance level for all accesses to the hot spot.

As mentioned above, a logical volume including a lager than desired hot spot (e.g., LV1 in FIGS. 4(a)–4(b)) can be split in any of numerous ways, and the present invention is not limited to any particular splitting technique. In the illustrative embodiment shown in FIG. 5, the splitting of the logical volume LV1 is accomplished by employing the concept of storage system volumes (e.g., SSV1 and SSV2), so that the splitting of the logical volume LV1 is transparent to the host computer 1 (FIG. 1). In this respect, as mentioned above, the cache 11 typically allocates a limited number of slots 27 to any particular volume. This allocation of cache slots can be made based upon logical volumes visible to the host computer 1 as described above, or can be based upon storage system volumes that are transparent to the host computer. In this respect, many storage systems support the splitting of a single physical storage device (e.g., one of disk drives 5a–5b in FIG. 1) into two or more logical storage system volumes, referred to as hyper-volumes by EMC Corporation, Hopkinton, Mass., and as luns in conventional RAID array technology. The use of such storage system volumes is advantageous in that it facilitates management of these smaller storage system volumes within the storage system 3, and in particular within the cache 11. In this respect, the cache 11 will typically include a particular number of cache slots dedicated to each logical volume or storage system volume. By employing storage system volumes, the cache 11 can manage a smaller volume of information, which may result in fewer collisions within the cache slots dedicated to each storage system volume (e.g., SSV1 and SSV2 in FIG. 5) than might occur if the cache was organized using larger logical volume boundaries (e.g., LV1 in FIGS. 4(a)–4(b)) as discussed above.

In accordance with one embodiment of the present invention, the multiple storage system volumes that result from splitting a logical volume including a hot spot that overflows the cache are combined to create a "metavolume" that is presented to the host computer 1 as the single logical volume that was split (e.g., LV1), so that the splitting of the logical volume is transparent to the host computer 1. This combining can be done in any of numerous ways, and the present invention is not limited to any particular technique. As an example, the SYMMETRIX line of disk arrays available from EMC Corporation supports the creation of metavolumes in a storage system cache such as cache 11 shown in FIG. 1. A metavolume is employed to concatenate together a plurality of logical volumes or storage system volumes (e.g., hyper-volumes) to form a single large metavolume that looks to the host computer 1 like a single logical volume. Thus, by employing the metavolume technology, two or more storage system volumes (e.g., SSV1 and SSV2 in FIG. 5) can be presented to the host computer as the single logical volume (e.g., LV1) that they represent, thereby advantageously ensuring that the splitting of the logical volume is done in a manner that is transparent to the host computer 1.

Although the embodiment of the present invention discussed above wherein the splitting of the logical volume is transparent to the host computer 1 is advantageous, it should be appreciated that the present invention is not limited in this respect.

The detection of a hot spot that overflows the cache slots dedicated to a logical volume can be implemented in any of numerous ways, and the present invention is not limited to any particular detection technique. In accordance with one embodiment of the present invention, facilities provided by the storage system 3 are used to perform the detection in a manner that is transparent to the host computer 1, and that does not require manual intervention by a system administrator. This implementation is advantageous, in that the splitting of the hot spot to achieve improved system performance can be done automatically without requiring any modification to the application running on the host computer 1, and without requiring manual intervention.

It should be appreciated that an intelligent storage system 3 such as that shown in FIG. 1 can monitor the performance of the cache 11 and can accumulate significant knowledge concerning the operation thereof. In the illustrative system shown in FIG. 1, such knowledge can be distributed amongst the storage bus directors 9 and the disk controllers 7a–7b, each of which is coupled to the cache 11 via the internal bus 13. For example, the storage system 3 may have timers that monitor how long the data within each cache slot (e.g., 27a–d in FIG. 5) has resided in the cache 11, because such timers can be useful when implementing a replacement algorithm for the cache 11. Using such counters, one technique for determining when a logical volume includes a hot spot that is overflowing the cache slots (e.g., 27a and 27b in FIG. 4(*a*)) dedicated to the logical volume is to detect that the same data segments are repeatedly being called into the cache 11 for a particular logical volume, but do not stay in the cache very long. An alternate technique for detecting a hot spot overflowing the cache 11 is to detect repeated frequent accesses to the same data segments of a logical volume that result in misses in the cache 11.

Some intelligent storage systems (e.g., the SYMMETRIX line disk of arrays available from EMC Corporation) that dedicate a fixed number of cache slots to a particular logical volume provide the capability of temporarily resizing the portion of cache dedicated to any logical volume under certain circumstances. For example, when a sequential read or write to a logical volume is executed that is larger than the amount of storage provided by the cache slots available to the logical volume, the storage system 3 may temporarily expand the number of slots dedicated to the logical volume to accommodate the large sequential access. Thereafter, the storage system 3 will rapidly attempt to reduce the number of slots dedicated to the logical volume by destaging the data in the expanded slots to the disk drives 5a–5b. Thus, if a large hot spot is repeatedly accessed sequentially, the cache slots dedicated to the corresponding logical volume will be repeatedly resized to accommodate the large sequential access. It should be appreciated that although the cache slots allocated to the logical volume are resized to accommodate the access to the hot spot, the overflowing of the cache slots typically allocated to the logical volume still results in performance degradation, because each time the cache slots overflow, data in the cache must be destaged to the disk drives 5a–5b (FIG. 1) to make space available to accommodate the overflow.

In a storage system 3 that performs a resizing of the cache as discussed above, an alternate technique for detecting a hot spot that overflows the cache is to detect repeated resizing of the cache based upon accesses to data segments adjacent to those stored in the cache for a particular logical volume. For example, referring to the example of FIGS. 4(*a*)–4(*b*), the hot spot including HS1–HS4 could be repeatedly accessed as a large sequential data access. In a storage system that performs a resizing of the cache slots 27a–27b dedicated to logical volume LV1, the cache 11 can repeatedly resize the cache slots available to LV1 to accommodate sequential accesses to the entire hot spot. However, thereafter, the storage system will rapidly attempt to reduce the number of slots dedicated to LV1 to the two cache slots 27a–27b. Therefore, each time the entire hot spot is sequentially accessed, the cache 11 will perform a resizing based upon accesses to data segments (e.g., HS3–HS4) adjacent to those already stored in the cache 11 for the logical volume (e.g., HS1 and HS2).

In the illustrative example discussed above in connection with FIGS. 4(*a*), 4(*b*) and 5, the hot spot is broken into two segments assigned to storage system volumes SSV1 and SSV2. However, it should be appreciated that the present invention is not limited in this respect, and that a particularly large hot spot may be sufficiently large so that if split in half, it would still overflow the cache slots dedicated to a storage system volume. Thus, the aspect of the present invention relating to the splitting of a hot spot is not limited to splitting a hot spot in two, as a hot spot can be subdivided into smaller units. In addition, although in the example shown in FIGS. 4–5 the hot spot is split into evenly sized segments, it should be appreciated that the present invention is not limited in this respect, and that a hot spot can be split at any location deemed desirable.

As discussed above, the detection of a hot spot that overflows the cache slots dedicated to a logical volume and the splitting up of such a hot spot can be implemented, for example, in the disk controllers 7a–7b and storage bus directors 9 in a storage system such as that shown in FIG. 1. It should be appreciated that these system components can be implemented in any of numerous ways, and the present invention is not limited to any particular implementation. For example, each of the storage bus directors 9 and disk controllers 7a–7b can be implemented as a processor that is programmed using microcode or software (e.g., stored locally or within the cache 11) to perform the functions recited above. Alternatively, dedicated hardware can be employed to implement these system components.

It should be appreciated that there are a number of options for the target location to which data can be moved when splitting up a hot spot so that it is not contained entirely within a single logical volume. In one embodiment of the present invention, the moved data is not placed on the same physical disk drive 5a–5b as the other data in the hot spot. In this respect, it should be appreciated that when a hot spot is stored in one large contiguous area on a disk drive, a single large sequential I/O operation can be performed to read the entire hot spot from the disk drive, which maximizes the efficiency of the disk drive for reading a particular amount of data. However, if a hot spot was placed on the same disk drive after being split into two or more non-contiguous segments, two or more separate I/O operations would be required to the disk drive each time the hot spot was moved between the disk drive and the cache 11. This would decrease the efficiency of the disk drive for accessing the data that constitutes the hot spot. Thus, in accordance with one embodiment of the present invention, the splitting of the hot spot into two or more volumes (e.g., storage system volumes SSV1 and SSV2 in FIG. 5) includes mapping those volumes within the storage system 3 so that they are stored on different physical disk drives 5*a*–5*b*. It should be appreciated that this enables the hot spot to be accessed more efficiently, because the two or more sections of the hot spot can be accessed simultaneously from the multiple disk drives.

As discussed above, the present invention is not limited to the detecting and splitting of hot spots, as that is merely one example of a situation wherein the manner in which data in the storage system 3 is accessed can be monitored, and then the placement of the data within the storage system 3 can be altered to achieve increased system performance. Another example also relates to Applicants' discovery that hot spots may actually provide performance improvements in a cached storage system. Thus, in accordance with another illustrative embodiment of the invention, two or more relatively frequently accessed areas of data can be combined in a contiguous storage space within a particular logical volume to create a hot spot. In this manner, two or more smaller locations that are accessed relatively frequently, but not sufficiently frequently on their own to remain in cache long enough to be reaccessed from cache, can be combined to create a hot spot that, together, is accessed with sufficient frequency to ensure that the entire hot spot will be maintained in cache. Thus, better system performance is achieved with respect to the accesses to each of the smaller components that comprises the newly created hot spot.

Frequently accessed areas of data can be combined to create a hot spot in any of numerous ways, and the present invention is not limited to any particular manner of implementation. For example, the ability of the storage system 3 (FIG. 1) to create a storage system volume (e.g., a hypervolume) can be employed, in a manner analogous to that described above in connection with FIG. 5, to form a new storage system volume in which the frequently accessed areas of data are combined to create the hot spot. Thus, the hot spot will not be swapped out of the cache 11 (FIG. 1) as frequently, such that greater system performance will be achieved for accesses to the newly created hot spot. Alternatively, a hot spot can be created by simply moving data segments around within the same logical volume as shown in FIGS. 6(*a*)–6(*b*).

Figure 6A:
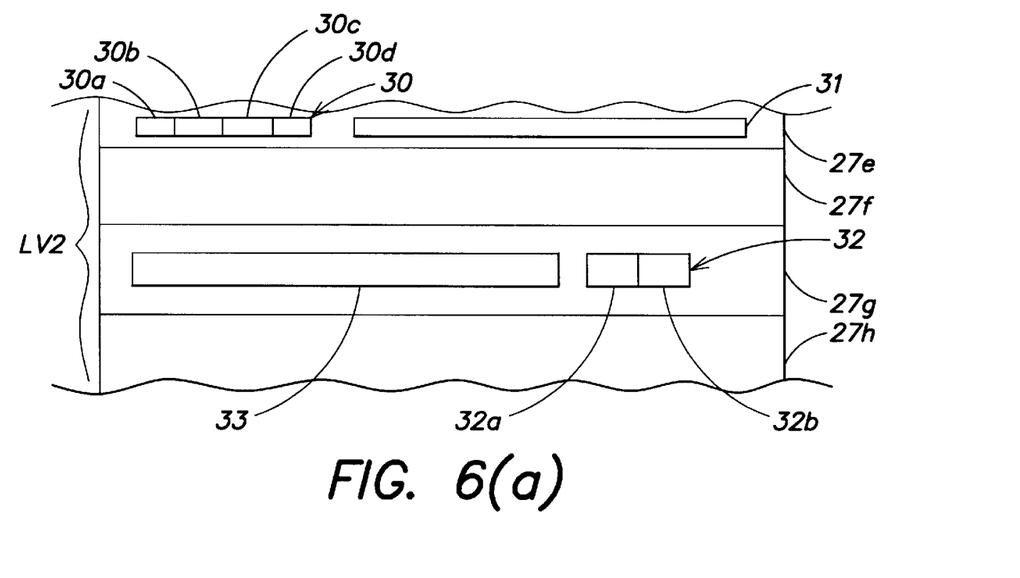
FIGS. 6(a)–6(b) are schematic representations of the combining of frequently accessed data segments to form a hot spot in accordance with another illustrative embodiment of the present invention.
Figure 6B:
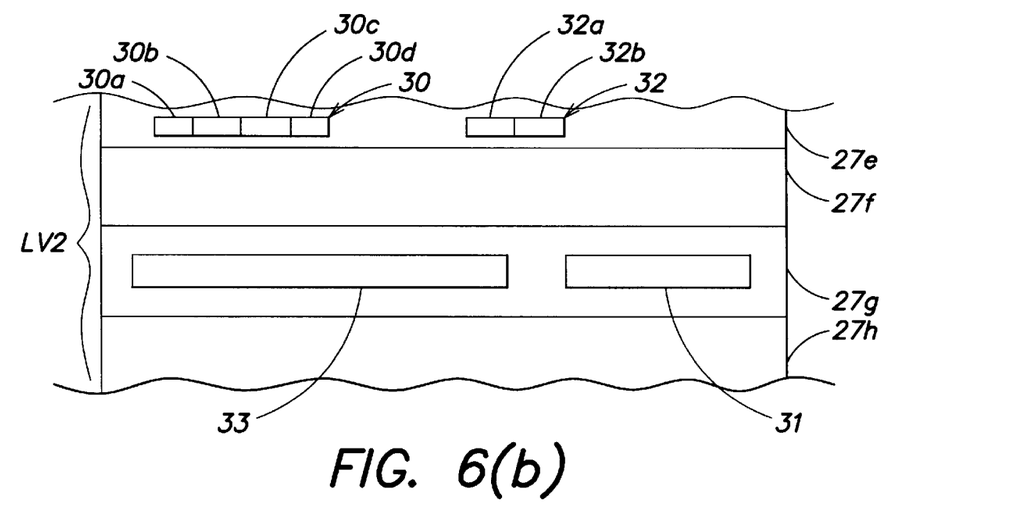

FIG. 6(*a*) illustrates a set of four cache slots 27*e*–27*h* dedicated to a logical volume LV2. It should be appreciated that in some storage systems 3, each of the cache slots 27*e*–27*h* is sized to store a particular amount of data, e.g., a track of data. In the illustrative example shown in FIG. 6(*a*), a track of data stored in cache slot 27*e* includes a first segment of data 30 (made up of data blocks 30*a*–30*d*) that is frequently accessed and a data segment 31 that is not. Similarly, the track of data stored in cache slot 27*g* includes a data segment 32 (including data blocks 32*a*–32*b*) that is frequently accessed and a data segment 33 that is not. While the data segments 30 and 32 are accessed with relative frequency, they are not accessed sufficiently frequently to ensure that their corresponding tracks remain in the cache long enough to be reaccessed from cache. Thus, in accordance with one illustrative embodiment of the invention, the data within logical volume LV2 can be reorganized as shown in FIG. 6(*b*), such that the data segments 30 and 32 are included in the same track of data so that they are stored together within one of the cache slots (i.e., cache slot 27*e* in the illustrative example of FIG. 6(*b*)). In this manner, a hot spot can be created including data segments 30 and 32, so that the newly constituted track including those data segments can be accessed with sufficient frequency to ensure that the track will be maintained in the cache, thereby achieving better system performance for accesses to the data segments 30 and 32.

As with the embodiment described above relating to the splitting of a hot spot, it should be appreciated that the detection of data segments that can be advantageously combined to form a hot spot can be performed in any of numerous ways, such that the present invention is not limited to any particular detection technique. As with the above-described embodiment relating to the splitting of hot spots, the detection can be performed by the storage bus directors 9 and the disk controllers 7*a*–7*b*, which monitor accesses to the cache 11. Candidates for combination to form a hot spot will miss in the cache with a relatively high level of frequency. Thus, combining such data segments together in a newly created storage system volume (e.g., a hypervolume) will achieve the benefits discussed above. Alternatively, candidates for combination into a single track as discussed in connection with FIG. 6(*b*) can be detected by frequent accesses being made to particular tracks, but wherein only certain data blocks within the tracks are actually accessed.

In another embodiment of the present invention, a large data set that is accessed sequentially can be split up to enable greater system performance. This is similar in some respects to the splitting of a hot spot described above, except that the large data set may not be accessed with sufficient frequency to be considered a hot spot, and therefore, does not experience the above-described thrashing within the cache slots for a particular logical volume. However, the data set may be accessed with sufficient frequency to warrant taking measures to increase the performance of the storage system when accessing the data set. By splitting the data set across multiple disk drives 5*a*–5*b* (FIG. 1), portions of the data set can be accessed simultaneously from the disk drives, thereby increasing system performance when transferring the data set between the cache 11 and the disk drives 5*a*–5*b*.

The splitting up of a large sequentially accessed data set is analogous in some respects to data striping techniques which attempt to achieve increased performance by striping a data set across multiple disk drives. However, this aspect of the present invention differs significantly from striping in at least three significant respects. First, the trigger condition for splitting up the large data set in this embodiment of the present invention is a detection, during normal operation of the system, that doing so would provide increased system performance. This is distinguishable from a striping technique, wherein the system must be pre-configured in its striped configuration. Second, this aspect of the present invention can be performed with minimal interruption to the computer system and in a manner that is transparent to the host computer 1. Conversely, to implement conventional striping techniques, the entire data set on the storage system 3 would need to be reconfigured in a striped arrangement, which is an extremely time consuming process. Finally, striping techniques are conventionally performed for all data on a storage system 3, whereas the above-described aspect of the present invention is directed to the splitting up of a specific data set, while leaving the remainder of the data in the storage system intact in a non-striped configuration.

The detection of a large sequentially accessed data set can be achieved in any of numerous ways, and the present invention is not limited to any particular detection technique. As with the embodiments of the present invention discussed above, the detection can be performed by the storage bus directors 9 and disk controllers 7a–7b that monitor access to the cache 11. For example, the storage system 3 can maintain records of relatively large data sets that are accessed sequentially, as well as the frequency at which they are accessed. Such records can be maintained, for example, in local storage elements in the storage bus directors 9 or the disk controllers 7a–7b, or in the cache 11. When it is determined that a particular large data set is accessed sequentially with sufficient frequency to justify splitting the data set to achieve increased system performance, the data set can be split in the manner described above to achieve such increased performance.

As discussed above, in one embodiment of the present invention data is moved or reconfigured within the storage system 3 to achieve increased system performance in a manner transparent to the host computer 1. In this embodiment of the invention, the storage system 3 is provided with the ability to move data on its own, completely independent from the host. This can be accomplished in any of numerous ways, and the present invention is not limited to any particular manner of implementation.

In the SYMMETRIX line of disk arrays available from EMC Corporation, an internal copy feature is provided wherein data can be copied from one location in the storage system 3 to another without passing the data through the host computer 1. This internal copy feature can be performed by one of the disk controllers 7a–7b (FIG. 1). In one embodiment of the invention, this internal copy feature is advantageously employed to move data internally within the storage system 3 to implement the embodiments of the present invention described above. After copying the data to a newly selected location, the original location from which the data was copied can be freed (i.e., made available for reuse).

In one embodiment of the invention, the storage system 3 determines the new location for any data moved to implement the aspects of the present invention discussed above. As mentioned above, the storage system 3 includes a mapping layer 25 (FIG. 2) that maps from the logical volume label provided by the host computer 1 to the actual physical location (i.e., a particular disk drive 5a–5b and the location thereon) wherein the data is stored. As will be appreciated by those skilled in the art, the mapping layer 25 typically includes metadata that identifies the physical storage locations for the blocks of data that form a particular logical volume. When data is moved within a logical volume (e.g., see FIGS. 6(a)–6(b)) using the internal copy capability discussed above, the metadata for the logical volume can simply be modified to map to the new physical storage locations for the data blocks that have moved. In this manner, all accesses to the logical volume from the host computer 1 will be mapped to the appropriate storage locations in a manner that is transparent to the host computer 1.

For those embodiments of the present invention described above wherein it is advantageous to reconfigure the data within the storage system by creating a new storage system volume (e.g., SSV1 and SSV2 in FIG. 5) or hyper-volume, in one embodiment of the present invention the storage system 3 can create such new volumes in a manner that is transparent to the host computer 1. In this respect, in addition to including the metadata that identifies the physical storage locations for the logical volumes visible to the host computer 1, the storage system mapping layer 25 (FIG. 2) also includes information identifying open storage areas in the storage system 3. In particular, the storage system mapping layer 25 can identify storage system volumes or hyper-volumes that are not currently assigned, as well as what data segments (e.g., tracks) are available in the disk drives 5a–5b. Thus, for those embodiments of the present invention discussed above wherein it is desirable to create a new storage system volume, the storage system mapping layer 25 can be queried to identify an available storage system volume (e.g., a hyper-volume) and a set of available data tracks which can be used to create the new storage system volume.

It should be appreciated that when finding a new location for data being moved in accordance with any of the above-described embodiments of the present invention, the target location for the moved data need not be within the same storage system 3. For example, configurations are known wherein two storage systems may be coupled together. An example of such a configuration is a remote data facility available from EMC Corporation. If another storage system is coupled to the storage system 3 shown in FIG. 1, the splitting or moving of data can be accomplished by moving some of the data to a sister storage system, such that the moved data need not be stored on the same storage system 3.

It should be appreciated that the above-described embodiments of the present invention are not limited to use on a storage system 3 having the configuration shown in FIG. 1. For example, as discussed above, the aspects of the present invention can be employed with any type of storage system, and are not limited to use with a disk drive storage system. Furthermore, the system shown in FIG. 1 includes multiple paths for communication between the host computer 1 and the storage system 3. It should be appreciated that the present invention is not limited to use in a multiple-path system, and can be employed in a computer system wherein a single path is provided between the host computer 1 and the storage system 3. In addition, it should be appreciated that numerous other configurations of the storage system 3 can be provided, and that the present invention is not limited to a system that employs storage bus directors 9, disk controllers 7a–7b and a cache 11 arranged in the configuration shown in FIG. 1.

Furthermore, as discussed above, several embodiments of the present invention advantageously operate in a manner that is transparent to the host computer 1, such that the detection of a condition warranting the reconfiguration of data on the storage system 3, as well as the actual reconfiguring of the data can both be performed in the storage system 3 in a manner that is transparent to the host computer 1. Although such transparent operation is preferred, it should be appreciated that the present invention is not limited in this respect, and that one or both of the detection and reconfiguration steps can be performed via the host computer 1, either automatically or under the manual control of a system administrator. In this respect, the above-described embodiments of the present invention illustrate several situations wherein the reconfiguration of data on the storage system 3 can achieve increased system performance. Although less desirable than the preferred embodiments disclosed herein, it should be appreciated that these aspects of the present invention contemplate the performance of the detection and/or reconfiguration steps using assistance from the host computer 1.

Passing Physical Configuration Information to the Host Computer

An alternate embodiment of the present invention is directed to passing information concerning the physical layout of data within the storage system 3 to the host computer 1. The host computer 1 can use this information in configuring the data amongst the logical volumes passed to the storage system 3 to optimize the overall performance of the computer system. As discussed above, when the storage system 3 (FIG. 1) is an intelligent storage system that controls the location wherein data accessible by the host computer 1 is stored, the exact physical location (i.e., which one of the disk drives 5a–5b and the location on the disk drive) wherein any block of data is actually stored is transparent to the host computer. Thus, while the host computer 1 typically maps data objects to a particular logical volume that the host computer 1 perceives to correspond to an actual physical storage device, the mapping between a logical volume and a physical disk drive 5a–5b may not be 1:1, such that a single logical volume can be split across multiple physical disk drives, or alternatively, multiple logical volumes can be stored on the same physical disk drive.

Figure 7:
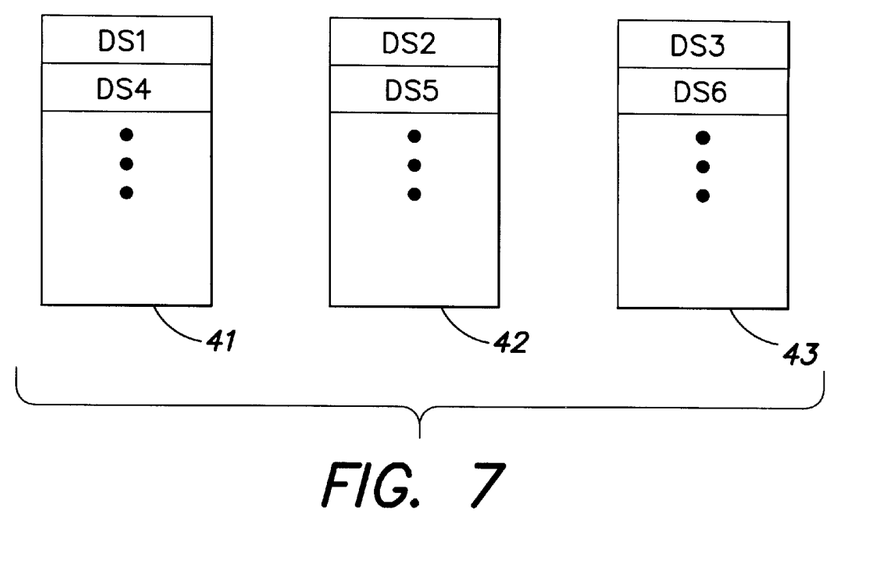
FIG. 7 illustrates the striping of contiguous data segments in a striped system.

Applicants have discovered that in certain situations, it would be beneficial for the host to be provided with some knowledge concerning the actual physical locations (e.g., on the disk drives 5a–5b) wherein the data blocks forming the logical volumes specified via the host computer 1 are stored. An example of such a situation relates to a striped system. As will be appreciated by those skilled in the art, a striped system distributes contiguous segments of data amongst multiple physical storage devices (e.g., disk drives 5a–5b) so that the contiguous data segments can be accessed in parallel from the multiple physical devices. This is shown conceptually in FIG. 7, which illustrates a contiguous group of six data segments labeled DS1–DS6 divided into three stripes 41–43. In a conventional striped system, the host computer 1 will assign each of the stripes 41–43 to a different logical volume, which the host computer 1 perceives will result in each of the stripes being stored on a different physical device (e.g., disk drives 5a–5b). If each of the stripes 41–43 is actually stored on a different physical storage device, it should be appreciated that contiguous data segments DS1–DS3 could be read simultaneously from the three separate physical storage devices, thereby enabling efficient access to this contiguous group of data segments. However, it should be appreciated that when such a striped configuration is employed using an intelligent storage system such as the storage system 3 shown in FIG. 1, the separate logical volumes created for stripes 41–43 may not actually be mapped to different physical storage devices. For example, the logical volumes created for stripes 41 and 42 could both be mapped by the storage system mapping layer 25 (FIG. 2) to a single disk drive 5a–5b in the storage system 3. If this occurs, the benefits that the host computer 1 perceives are being attained via the striped configuration will not occur, as data segments DS1 and DS2 will need to be accessed from the same disk drive 5a–5b, such that they cannot be accessed in parallel. In addition, the data segments DS1 and DS2 will likely not be stored at contiguous locations on the disk drive, which will result in two accesses being necessary to the disk drive 5a–5b to access these data segments.

As should be appreciated from the foregoing, by providing information from the storage system 3 to the host computer 1 concerning the manner in which the logical volumes specified via the host computer are mapped to the disk drive 5a–5b, the above-described problem can be avoided. In particular, the entity (e.g., a file system or logical volume manager in layer 23 in FIG. 2) on host computer 1 that manages the mapping of the data segments to particular logical volumes can utilize this information to ensure that the data segments that are desired to be included in different stripes 41–43 can be assigned to logical volumes that are mapped by the storage system mapping layer 25 (FIG. 2) to different disk drives 5a–5b within the storage system 3. Thus, in accordance with one illustrative embodiment of the present invention, information concerning the actual mapping of the logical volumes provided by the host computer 1 to the physical storage devices (e.g., disk drives 5a–5b) is provided to the host computer 1 to enable the host computer to assign data segments amongst the logical volumes in a manner that maximizes system performance.

It should be appreciated that the information passed to the host computer 1 in accordance with this embodiment of the present invention is not limited to identifying which logical volumes map to which physical storage devices, as other information concerning the configuration of the storage system 3 can also be useful to the host computer 1. For example, as will be appreciated by those skilled in the art, in a computer system such as that shown in FIG. 1, protection schemes are typically provided so that not all users and/or applications executing on the host computer 1 have the same access privileges to all data stored on the storage system 3. In this respect, some data stored on the storage system 3 may only be accessible to certain users and/or applications, or the types of access (e.g., read, write or read/write) enabled may differ for different users/applications. Typically, protection privileges are provided at the physical level, such that all of the data stored on a particular physical storage device (e.g., a disk drive 5a–5b) have the same access privileges. It should be appreciated that it is generally desirable to ensure that a particular logical volume defined by the host computer 1 has the same protection level for all portions thereof stored within the storage system 3. Thus, in accordance with one illustrative embodiment of the invention, the nature of the protection levels provided for the disk drives 5a–5b can be provided to the host computer 1, which can then use this information to ensure that all of the data segments for a particular logical volume are stored on physical storage devices having a common protection level.

An additional example where information pertaining to a characteristic of the physical storage devices may be beneficial to the host computer 1 relates to fault tolerance techniques that may be employed to ensure that all data on the storage system is recoverable in the event of a malfunction of one of the disk drives 5a–5b. In this respect, several data redundancy techniques are known, such as mirroring all data on mirror disk drives, and RAID (Redundant Array of Independent Disks) techniques. It should be appreciated that the type of redundancy technique employed can impact system performance. For example, data access from a disk drive that is mirrored will typically be faster than accessing a disk drive employed as part of a RAID scheme. It is generally desirable to ensure that the access performance for all data segments within a particular logical volume is consistent. Thus, by providing information to the host computer 1 concerning the type of data redundancy techniques employed for particular physical storage devices (e.g., disk drives 5a–5b), the host computer can ensure that each logical volume is stored on physical disk drives that will experience the same level of performance.

It should be appreciated that the three above-discussed examples are provided merely for illustrative purposes, and that the embodiment of the present invention relating to providing the host computer 1 with information relating to the mapping of the logical volumes to particular physical storage devices is not limited to the above-described examples, as numerous other implementations are possible. It should further be appreciated that this aspect of the present invention can be implemented in any of numerous ways, and that the present invention is not limited to any particular manner of implementation. For example, an application programming interface can be defined between the host computer 1 and the storage system 3 that enables the host computer 1 to provide a request to the storage system 3 for information relating to the physical mapping for a particular logical volume, as well as information relating to certain characteristics of the physical device(s) on which the logical volume is stored. This information can be used by various portions of the host computer 1 (e.g., the file system/logical volume mapping layer 23 of FIG. 2) to configure data amongst the logical volumes defined by the host computer 1 in a manner that will maximize system performance once those logical volumes are mapped to the physical layer within the storage system 3. Thus, using the information provided by the storage system 3, the host computer 1 can make more intelligent mapping decisions that will improve the overall performance of the computer system.

Reconfiguring Data Between Two Storage Systems

Figure 8:
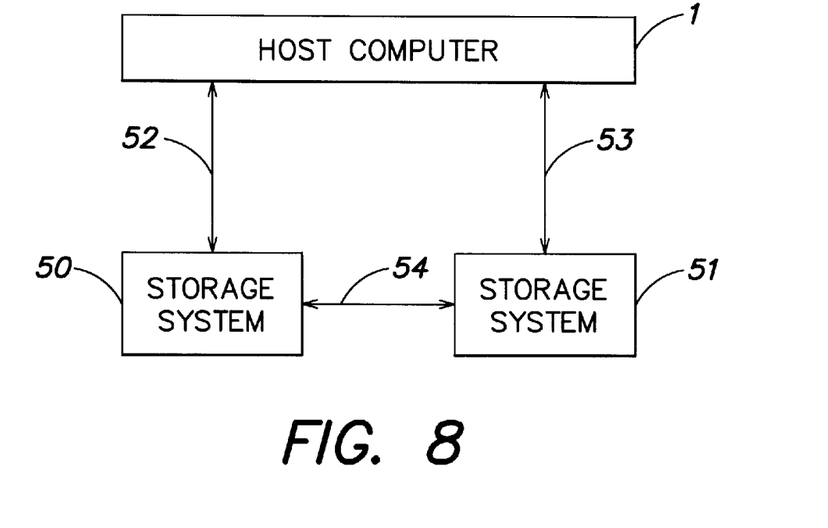
FIG. 8 is a block diagram of a computer system including a host computer coupled to a plurality of storage systems.

Another embodiment of the present invention is directed to a computer system as shown in FIG. 8, wherein a host computer 1 is connected to two or more storage systems 50 and 51. The storage systems 50 and 51 each may be implemented in the manner of the storage system 3 shown in FIG. 1. However, as with the other embodiments of the invention, this aspect of the present invention can be employed in connection with any computer system wherein a host computer is coupled to two or more storage systems of any type, such that the present invention is not limited to use with a storage system having the particular configuration shown in FIG. 1.

In the computer system shown in FIG. 1, the storage systems 50-51 are respectively coupled to the host computer 1 via a pair of communication links 52-53. It should be appreciated that each of communication links 52 and 53 can be implemented as a single-path communication link, or a multi-path communication link of the type shown in FIG. 1.

Some computer systems are configured in the manner shown in FIG. 8 so that the host computer 1 can access the two or more storage systems 50-51 to store data used by the host computer 1. Thus, the host computer 1 will store some of the logical volumes of data that it accesses in one of the storage systems 50, and others in the storage system 51. It should be appreciated that depending upon the nature of the applications running on the host computer 1, there may be an imbalance in the share of the total workload carried by the storage devices 50-51, such that one may be significantly busier than the other. Thus, one embodiment of the present invention is directed to redistributing the data stored between the multiple storage systems 50-51 to achieve greater overall performance for the computer system.

It should be appreciated that there are numerous ways in which the portion of the overall workload carried by each of the multiple storage systems 50-51 can be determined. The aspect of the present invention relating to reconfiguring data between two or more storage systems is not limited to any particular technique for analyzing the workload carried by each of the storage systems. In addition, in a related application entitled METHOD AND APPARATUS FOR BALANCING WORKLOADS AMONG MULTIPLE PATHS IN A MULTI-PATH COMPUTER SYSTEM, filed by the Applicants of the present application on even date herewith, which is hereby incorporated herein by reference, numerous techniques are disclosed for balancing the workload among multiple paths in a multi-path computer system such as that shown in FIG. 1. The techniques disclosed in that related application can also be employed to balance the workload distributed between multiple storage systems in a computer system such as that shown in FIG. 8.

The aspects of the present invention recited herein can be employed to reconfigure the data stored among the multiple storage systems 50-51 in any manner that is determined to advantageously impact the overall performance of the computer system. As discussed in the above-referenced related application, optimal system performance may, for some applications, result from an imbalance in the level of busyness over different paths in the computer system. For example, workload analyzers that run on a host computer 1 are known, and any such analyzer can be employed with this aspect of the present invention.

In accordance with one embodiment of the present invention, when it is determined that a different balance in the workload distributed between two or more storage systems could achieve greater system performance, the data distributed between the multiple storage systems 50-51 is reconfigured to optimize system performance. This can be done in a number of ways. For example, the host computer 1 can control the process of moving data from one of the storage systems (e.g., storage system 50), through the host computer 1, to the other storage system (e.g., storage system 51). However, it should be appreciated that having the host computer 1 control the movement of data will negatively impact the performance of the host computer 1 during the data reconfiguring phase. Thus, in accordance with one illustrative embodiment of the invention, the reconfiguration of the data between the multiple storage systems is performed without passing the data through the host computer 1. In this respect, a direct link 54 can be provided between the storage systems 50 and 51 and can be used to perform the transfer of data therebetween.

The link 54 can be implemented in any of numerous ways and the present invention is not limited to any particular implementation. For example, when each of the storage systems 50-51 is implemented using the SYMMETRIX line of disk arrays available from EMC Corporation, a feature called SYMMETRIX Remote Data Facility (SRDF) can be employed to implement the link 54. SRDF is described in numerous publications available from EMC Corporation, including the SYMMETRIX Remote Data Facility Product Manual, P/N 200-999-554, rev. B, June, 1995. SRDF provides the capability of automatically transferring data between two SYMMETRIX disk arrays without passing the data through a host computer coupled to either storage system.

As should be appreciated from the foregoing, when the host computer 1 detects a condition suggesting that better overall system performance could be achieved by reconfiguring the data distributed between the multiple storage systems 50-51, the host computer 1 can trigger the storage system that includes the data to be moved to execute movement of the data over the link 54. In one embodiment of the present invention, this is accomplished in a manner that is transparent to the host computer application that accesses the data. For example, the processor 16 (FIG. 1) in most host computers includes a filter driver that is responsible for distributing I/O operations among the host bus adapters 15. The filter driver can be implemented as a software program that can be stored on a computer readable medium, and can be executed on the processor 16, or the filter driver can be provided with its own dedicated processor. The triggering of the storage systems 50–51 to execute the movement of data to achieve improved system performance can, for example, be controlled by the filter driver.

In addition to moving the data from one of the storage systems 50–51 to the other, it should be appreciated that some technique should be employed to identify, to the application program that executes on the host computer and accesses the data, the new location for the moved data. The Present invention is not limited to any particular technique for providing such an indication to the application program. In accordance with one illustrative embodiment of the invention, when the data is moved from one of the storage systems 50–51 to the other, the host computer 1 will create a new label (e.g., a new logical volume) for accessing the data over a different one of the communication paths 52–53. The selection of a particular logical volume to be created to include the moved data can be accomplished using the other aspects of the present invention discussed above to select an optimum location for the moved data. The process of triggering creation of the new logical volume can be controlled by the filter driver, which can also maintain an additional layer of mapping between the logical volumes presented by the storage systems 50–51 and those visible to the file system/LVM mapping layer 23. Prior to triggering movement of the data, the filter driver can suspend all I/O operations to the logical volume that includes the data to be moved. Thereafter, the data can be moved (e.g., using SRDF). Once the movement of the data is complete, the storage systems 50–51 can so notify the host computer 1, which can then complete the movement process.

Information Log

As discussed above, several embodiments of the present invention employ information relating to the configuration and/or performance of the computer system to make decisions impacting system performance. In this respect, the host computer can collect and store information (e.g., in the filter driver) relating to every I/O operation transmitted to the storage system. Examples of the kinds of information known to the host computer for every I/O operation include the following: (1) the type of I/O operation (e.g., read or write); (2) the application that submitted the I/O operation; (3) the size of the I/O operation; (4) the logical object in application space (e.g., a file name) to which the I/O operation relates; (5) the particular logical volume targeted by the I/O operation; (6) the particular communication path used to transmit the I/O operation; (7) the number of I/O operations queued to any particular path; (8) the number of different processes or applications that send I/O operations to a particular path; (9) the type and size of the I/O operations transmitted to a particular path; and (10) the average response times for particular types of I/O operations, for particular paths, and for particular target logical volumes.

While the statistics and information that can be gathered from the perspective of the host computer 1 are extremely beneficial and can be advantageously employed as described above, it should be appreciated that when the storage system 3 is an intelligent storage system such as that shown in FIG. 1, the perspective of the host computer 1 does not illuminate the entire picture concerning the performance of the computer system. In this respect, an intelligent storage system controls the location wherein data accessible via the host computer 1 is ultimately stored. Thus, the exact physical location (i.e., which one of the disk drives 5a–5b and the location on the disk drive) wherein any block of data is actually stored is transparent to the host computer.

It should be appreciated that an intelligent storage system such as that shown in FIG. 3 also has the capability of creating a log of statistics concerning the I/O operations transmitted from the host computer 1 to the storage system 3. Examples of the type of information that can be logged in the storage system 3 include: (1) the path through which each I/O operation was sent; (2) the actual physical storage device (e.g., the disk drive 5a–5b) that was targeted by the I/O operation; (3) the type of I/O operation (e.g., read or write); and (4) whether the I/O operation hit or miss in the cache 11. It should be appreciated that some of this information is unavailable to the host computer 1. For example, the host computer 1 has no information concerning the actual physical storage device on which a targeted logical volume is stored. Similarly, although the host computer 1 can make an educated guess concerning whether a particular I/O operation hit or miss in the cache 11 based on the response time of the storage system, only the storage system 3 knows for certain whether a hit or miss occurred.

While the statistics that can be collected by the storage system 3 are more detailed in some areas than those that can be collected via the host computer 1, they are also lacking in some areas. In this respect, it should be appreciated that the storage system 3 typically has no information concerning the source of I/O operations at the application layer 21 (FIG. 2). Thus, although the storage system 3 can accumulate a number of statistics helpful in analyzing the raw performance of I/O operations between itself and the host computer 1, the storage system 3 generally cannot directly determine the impact of certain I/O operations on the performance of applications executing on the host computer 1.

As should be appreciated from the foregoing, maintaining performance information or statistics solely on either the host computer 1 or the storage system 3 does not provide a complete picture that would be beneficial in analyzing the performance of the entire computer system in executing applications run on the host computer 1. Thus, in accordance with one illustrative embodiment of the present invention, a logging facility is provided that combines information available to the host computer 1 with information available to the storage system 3, to create a set of information that provides a more complete picture concerning the performance of the computer system. This can be done in any of numerous ways, and has a number of uses. For example, in one embodiment of the present invention, in addition to sending I/O operations to the storage system 3, the host computer 1 also transmits information relating to that I/O operation for storage in a logging facility maintained within the storage system 3. The correlation between the information and the I/O operation can be accomplished in any of numerous ways, such as by providing an I/O tag that uniquely identifies each I/O operation and its corresponding information. The information provided by the host computer 1 can then be interleaved with the additional information that the storage system 3 generates itself concerning the I/O operation, thereby providing overall end-to-end information concerning the I/O operation. A statistical log can then be generated and stored on the storage system 3 and can be used in any of numerous ways. Alternatively, it should be appreciated that this aspect of the present invention can be implemented in the inverse manner, by transmitting information from the storage system 3 to the host computer 1 concerning each I/O operation. However this implementation is less preferred, as the greater availability of storage space within the storage system 3 makes it a better candidate for storing the statistical log, which may grow to be of considerable size.

As mentioned above, the aspect of the present invention relating to the creation of an information log can be used in any of numerous ways. In one embodiment of the invention, such a log can simply be used for mechanical analysis to provide a system administrator or system developer with a better picture of the overall performance of the computer system than is available using conventional logging techniques, which do not provide an overall picture as described above. For example, as discussed in the above-referenced related application relating to balancing workloads in a multi-path system, for some applications, prioritizing certain types of I/O operations can be more important to the overall system performance than maximizing the busyness of the storage system 3. Thus, conventional logging techniques that focus only on the performance of the storage system can be of limited use, or can even be misleading by failing to provide meaningful information concerning the performance of the applications running on the host computer 1.

In addition to providing a good statistical base for mechanical performance analysis, it should be appreciated that the logging subsystem aspect of the present invention can also be employed in connection with the other aspects of the present invention described above, such as those relating to managing the configuration of data within one or more storage systems 3 to achieve improved system performance. In this respect, by providing a better overall picture of the performance of applications running on the host computer 1, the logging subsystem of the present invention can enable more intelligent decisions to be made with respect to: (1) when the data within one storage system 3, or multiple storage systems 50–51 (FIG. 8), should be reconfigured to achieve improved system performance; and (2) the manner in which the data should be reconfigured to achieve improved system performance.

Another use for the logging subsystem aspect of the present invention is to assist in performing the load balancing techniques described in the above-referenced related application. By providing a more meaningful understanding of the manner in which the I/O operations for a particular application are performed, the logging subsystem of the present invention can enable more intelligent choices to be made when distributing I/O operations among the multiple paths to maximize the performance of each application. One example of the manner in which this can be achieved is that the logging subsystem may assist in identifying particular I/O operations that are critical to the overall performance of the application, and should be given a high priority in the manner described in the related application. Of course, other uses of the logging subsystem can also obviously be made by the load balancing techniques described in the related application.

As should be appreciated from the foregoing, in addition to providing statistical information for mechanical performance analysis, the logging subsystem aspect of the present invention can also be employed as a resource by both the host computer 1 and the storage subsystem 3 so that various decision-making processes running thereon can employ the information included in the logging subsystem in making decisions to achieve better system performance. Such use of the logging subsystem can be performed automatically, without the intervention of a system administrator.

As discussed above, the embodiments of the present invention described herein can be implemented in numerous ways, and the present invention is not limited to any particular manner of implementation. For example, the aspects of the present invention relating to the detection of a performance condition impacting the performance of the computer system, as well as those relating to reconfiguring at least some of the data within the storage system to alleviate the performance condition, can be performed in numerous ways within the storage system. In a system such as that shown in FIG. 1, the detecting and reconfiguring functions can be implemented, for example, within the disk controllers 7a–7b and/or the storage bus directors 9. In this respect, it should be appreciated that both of these system components can be generically considered as controllers, such that the storage system can be provided with at least one controller to perform the detecting and reconfiguring functions. These functions can be performed by a single controller, or can be distributed amongst multiple controllers in the manner described above.

As further discussed above, the controllers (e.g., the storage bus directors 9 and disk controllers 7a–7b in FIG. 1) that perform the aspects of the present invention can be implemented in numerous ways, such as with dedicated hardware, or using a processor that is programmed using microcode or software to perform the functions recited above. In this respect, it should be appreciated that one implementation of the present invention comprises a computer readable medium (e.g., a computer memory, a floppy disk, a compact disc, a tape, etc.) encoded with a computer program that, when executed on a processor, performs the above-discussed functions of the present invention. The computer readable medium can be transportable, such that the program stored thereon can be loaded onto a storage system or host computer to implement the aspects of the present invention discussed above. In addition, it should be appreciated that the reference to a computer program that, when executed, performs the above-discussed functions is not limited to an application program running in application space on the host computer. Rather, the term computer program is used herein in a generic sense to reference any type of computer code (e.g., software or microcode) that can be employed to program a processor to implement the above-discussed aspects of the present invention.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. In a computer system including a host computer and an intelligent storage system that is coupled to the host computer and stores data accessed by the host computer, the computer system including a plurality of logical volumes of data that are visible to the host computer and the storage system and that are perceived by the host computer as comprising a plurality of raw storage devices, the storage system including a plurality of physical storage devices and at least one mapping layer that maps the plurality of logical volumes to the plurality of physical storage devices so that the data in each of the plurality of logical volumes is stored on at least one of the plurality of physical storage devices, a method comprising a step of:

(A) providing the host computer with information identifying, for at least one of the plurality of logical volumes, which ones of the plurality of physical storage devices store data included in the at least one of the plurality of logical volumes.

2. The method of claim 1, wherein the step (A) includes a step of providing the host computer with information identifying which ones of the plurality of physical storage devices store data included in each of the plurality of logical volumes.

3. The method of claim 1, further including a step of:
   (B) providing the host computer with information concerning at least one characteristic of the ones of the plurality of physical storage devices that store data included in the at least one of the plurality of logical volumes.

4. The method of claim 3, wherein the computer system implements a protection scheme wherein each of the plurality of physical storage devices has an associated protection level, and wherein the step (B) includes a step of providing the host computer with information concerning the protection levels of the ones of the plurality of physical storage devices that store data included in the at least one of the plurality of logical volumes.

5. The method of claim 3, wherein the computer system implements a fault tolerant scheme wherein each of the plurality of physical storage devices is associated with a fault tolerant technique, and wherein the step (B) includes a step of providing the host computer with information concerning the fault tolerant techniques associated with the ones of the plurality of physical storage devices that store data included in the at least one of the plurality of logical volumes.

6. The method of claim 3, wherein each of the plurality of physical storage devices has a performance characteristic that impacts performance of the storage device, and wherein the step (B) includes a step of providing the host computer with information concerning the performance characteristics of the ones of the plurality of physical storage devices that store data included in the at least one of the plurality of logical volumes.

7. The method of claim 6, further including a step of:
   (C) using the information provided in the steps (A) and (B) to configure the at least one of the plurality of logical volumes so that the at least one of the plurality of logical volumes is stored on ones of the plurality of physical storage devices that have common performance characteristics.

8. The method of claim 1, wherein the computer system includes a configuration of data blocks among the at least one of the plurality of logical volumes, and wherein the method further includes a step of:
   (B) using the information identifying which ones of the plurality of physical storage devices store data included in the at least one of the plurality of logical volumes to reconfigure the data blocks among the at least one of the plurality of logical volumes.

9. The method of claim 1, further including a step of:
   (B) using the information identifying which ones of the plurality of physical storage devices store data included in the at least one of the plurality of logical volumes in determining a configuration of data blocks among the at least one of the plurality of logical volumes.

10. The method of claim 1, wherein the at least one logical volume is divided into multiple contiguous stripes, and wherein the method further includes a step of:
    (B) using the information identifying which ones of the plurality of physical storage devices store data included in the at least one of the plurality of logical volumes to ensure that each pair of contiguous stripes is stored on different ones of the plurality of physical storage devices.

11. The method of claim 4, further including a step of:
    (C) using the information provided in the steps (A) and (B) to ensure that the at least one of the plurality of logical volumes is stored entirely on one or more of the plurality of physical storage devices including a common protection level.

12. The method of claim 1, wherein the at least one of the plurality of logical volumes includes a single logical volume stored on a single one of the plurality of physical storage devices, so that the step (A) includes a step of providing the host computer with information identifying the single one of the plurality of physical storage devices that stores data included in the single logical volume.

13. The method of claim 1, further including a step of:
    (B) providing the host computer with information identifying, for each one of the plurality of physical storage devices identified in the step (A) as storing data included in the at least one of the plurality of logical volumes, a location on the one of the plurality of physical storage devices identified in the step (A) wherein the data included in the at least one of the plurality of logical volumes is stored.

14. A computer readable medium encoded with a program for execution on a computer system including a host computer and an intelligent storage system that is coupled to the host computer and stores data accessed by the host computer, the computer system further including a plurality of logical volumes of data that are visible to the host computer and the intelligent storage system and that are perceived by the host computer as comprising a plurality of raw storage devices, the storage system including a plurality of physical storage devices and at least one mapping layer that maps the plurality of logical volumes to the plurality of physical storage devices so that the data in each of the plurality of logical volumes is stored on at least one of the plurality of physical storage devices, the program, when executed on the computer system, performing a method comprising a step of:
    (A) providing the host computer with information identifying, for at least one of the plurality of logical volumes, which ones of the plurality of physical storage devices store data included in the at least one of the plurality of logical volumes.

15. The computer readable medium of claim 14, wherein the step (A) includes a step of providing the host computer with information identifying which ones of the plurality of physical storage devices store data included in each of the plurality of logical volumes.

16. The computer readable medium of claim 14, further including a step of:
    (B) providing the host computer with information concerning at least one characteristic of the ones of the plurality of physical storage devices that store data included in the at least one of the plurality of logical volumes.

17. The computer readable medium of claim 16, wherein the computer system implements a protection scheme wherein each of the plurality of physical storage devices has an associated protection level, and wherein the step (B) includes a step of providing the host computer with information concerning the protection levels of the ones of the plurality of physical storage devices that store data included in the at least one of the plurality of logical volumes.

18. The computer readable medium of claim 16, wherein the computer system implements a fault tolerant scheme wherein each of the plurality of physical storage devices is associated with a fault tolerant technique, and wherein the step (B) includes a step of providing the host computer with information concerning the fault tolerant techniques associated with the ones of the plurality of physical storage devices that store data included in the at least one of the plurality of logical volumes.

19. The computer readable medium of claim 16, wherein each of the plurality of physical storage devices has a performance characteristic that impacts performance of the storage device, and wherein the step (B) includes a step of providing the host computer with information concerning the performance characteristics of the ones of the plurality of physical storage devices that store data included in the at least one of the plurality of logical volumes.

20. The computer readable medium of claim 14, wherein the at least one of the plurality of logical volumes includes a single logical volume stored on a single one of the plurality of physical storage devices, so that the step (A) includes a step of providing the host computer with information identifying the single one of the plurality of physical storage devices that stores data included in the single logical volume.

21. The computer readable medium of claim 14, further including a step of:
(B) providing the host computer with information identifying, for each one of the plurality of physical storage devices identified in the step (A) as storing data included in the at least one of the plurality of logical volumes, a location on the one of the plurality of physical storage devices identified in the step (A) wherein the data included in the at least one of the plurality of logical volumes is stored.

22. A computer readable medium encoded with a program for execution on a computer system including a host computer and an intelligent storage system that is coupled to the host computer and stores data accessed by the host computer, the computer system further including a plurality of logical volumes of data that are visible to the host computer and the intelligent storage system and that are perceived by the host computer as comprising a plurality of raw storage devices, the storage system including a plurality of physical storage devices and at least one mapping layer that maps the plurality of logical volumes to the plurality of physical storage devices so that the data in each of the plurality of logical volumes is stored on at least one of the plurality of physical storage devices, the program, when executed on the host computer, performing a method comprising a step of:
(A) receiving information from the storage system identifying, for at least one of the plurality of logical volumes, which ones of the plurality of physical storage devices store data included in the at least one of the plurality of logical volumes.

23. The computer readable medium of claim 22, wherein the step (A) includes a step of receiving information identifying which ones of the plurality of physical storage devices store data included in each of the plurality of logical volumes.

24. The computer readable medium of claim 22, further including a step of:
(B) receiving from the storage system information concerning at least one characteristic of the ones of the plurality of physical storage devices that store data included in the at least one of the plurality of logical volumes.

25. The computer readable medium of claim 24, wherein the computer system implements a protection scheme wherein each of the plurality of physical storage devices has an associated protection level, and wherein the step (B) includes a step of receiving from the storage system information concerning the protection levels of the ones of the plurality of physical storage devices that store data included in the at least one of the plurality of logical volumes.

26. The computer readable medium of claim 24, wherein the computer system implements a fault tolerant scheme wherein each of the plurality of physical storage devices is associated with a fault tolerant technique, and wherein the step (B) includes a step of receiving from the storage system information concerning the fault tolerant techniques associated with the ones of the plurality of physical storage devices that store data included in the at least one of the plurality of logical volumes.

27. The computer readable medium of claim 24, wherein each of the plurality of physical storage devices has a performance characteristic that impacts performance of the storage device, and wherein the step (B) includes a step of receiving from the storage system information concerning the performance characteristics of the ones of the plurality of physical storage devices that store data included in the at least one of the plurality of logical volumes.

28. The computer readable medium of claim 22, wherein the at least one of the plurality of logical volumes includes a single logical volume stored on a single one of the plurality of physical storage devices, so that the step (A) includes a step of receiving from the storage system information identifying the single one of the plurality of physical storage devices that stores data included in the single logical volume.

29. The computer readable medium of claim 22, further including a step of:
(B) receiving information from the storage system identifying, for each one of the plurality of physical storage devices identified in the step (A) as storing data included in the at least one of the plurality of logical volumes, a location on the one of the plurality of physical storage devices identified in the step (A) wherein the data included in the at least one of the plurality of logical volumes is stored.

30. The computer readable medium of claim 22, further including a step of:
(B) using the information identifying which ones of the plurality of physical storage devices store data included in the at least one of the plurality of logical volumes in determining a configuration of data blocks among the at least one of the plurality of logical volumes.

31. The computer readable medium of claim 22, wherein the at least one logical volume is divided into multiple contiguous stripes, and wherein the method further includes a step of:
(B) using the information identifying which ones of the plurality of physical storage devices store data included in the at least one of the plurality of logical volumes to ensure that each pair of contiguous stripes is stored on different ones of the plurality of physical storage devices.

32. The computer readable medium of claim 25, further including a step of:
(C) using the information received in the steps (A) and (B) to ensure that the at least one of the plurality of logical volumes is stored entirely on one or more of the plurality of physical storage devices including a common protection level.

33. The computer readable medium of claim 27, further including a step of:
   (C) using the information received in the steps (A) and (B) to configure the at least one of the plurality of logical volumes so that the at least one of the plurality of logical volumes is stored on ones of the plurality of physical storage devices that have common performance characteristics.

34. The computer readable medium of claim 22, wherein the computer system includes a configuration of data blocks among the at least one of the plurality of logical volumes, and wherein the method further includes a step of:
   (B) using the information identifying which ones of the plurality of physical storage devices store data included in the at least one of the plurality of logical volumes to reconfigure the data blocks among the at least one of the plurality of logical volumes.

35. An intelligent storage system for use in a computer system including a host computer and the intelligent storage system to store data accessed by the host computer, the computer system including a plurality of logical volumes of data that are visible to the host computer and the storage system and that are perceived by the host computer as comprising a plurality of raw storage devices, the storage system comprising:
   a plurality of physical storage devices;
   at least one mapping layer that maps the plurality of logical volumes to the plurality of physical storage devices so that the data in each of the plurality of logical volumes is stored on at least one of the plurality of physical storage devices; and
   at least one controller to provide the host computer with information identifying, for at least one of the plurality of logical volumes, which ones of the plurality of physical storage devices store data included in the at least one of the plurality of logical volumes.

36. The intelligent storage system of claim 35, wherein the at least one controller is adapted to provide the host computer with information identifying which ones of the plurality of physical storage devices store data included in each of the plurality of logical volumes.

37. The intelligent storage system of claim 35, wherein the at least one controller is adapted to provide the host computer with information concerning at least one characteristic of the ones of the plurality of physical storage devices that store data included in the at least one of the plurality of logical volumes.

38. The intelligent storage system of claim 37, wherein the computer system implements a protection scheme wherein each of the plurality of physical storage devices has an associated protection level, and wherein the at least one controller is adapted to provide the host computer with information concerning the protection levels of the ones of the plurality of physical storage devices that store data included in the at least one of the plurality of logical volumes.

39. The intelligent storage system of claim 37, wherein the computer system implements a fault tolerant scheme wherein each of the plurality of physical storage devices is associated with a fault tolerant technique, and wherein the at least one controller is adapted to provide the host computer with information concerning the fault tolerant techniques associated with the ones of the plurality of physical storage devices that store data included in the at least one of the plurality of logical volumes.

40. The intelligent storage system of claim 37, wherein each of the plurality of physical storage devices has a performance characteristic that impacts performance of the physical storage device, and wherein the at least one controller is adapted to provide the host computer with information concerning the performance characteristics of the ones of the plurality of physical storage devices that store data included in the at least one of the plurality of logical volumes.

41. The intelligent storage system of claim 35, wherein the at least one of the plurality of logical volumes includes a logical volume stored on a single one of the plurality of physical storage devices, so that the at least one controller is adapted to provide the host computer with information identifying the single one of the plurality of physical storage devices that stores data included in the logical volume.

42. The intelligent storage system of claim 35, wherein the at least one controller is adapted to provide the host computer with information identifying, for each one of the plurality of physical storage devices identified as storing data included in the at least one of the plurality of logical volumes, a location on the one of the plurality of physical storage devices wherein the data included in the at least one of the plurality of logical volumes is stored.

43. The intelligent storage system of claim 35, wherein the at least one controller includes means for providing the host computer with the information identifying, for the at least one of the plurality of logical volumes, which ones of the plurality of physical storage devices store data included in the at least one of the plurality of logical volumes.

44. A host computer for use in a computer system including the host computer and an intelligent storage system that is coupled to the host computer and stores data accessed by the host computer, the computer system including a plurality of logical volumes of data that are visible to the host computer and the storage system and that are perceived by the host computer as comprising a plurality of raw storage devices, the storage system including plurality of storage devices and at least one mapping layer that maps the plurality of logical volumes to the plurality of physical storage devices so that the data in each of the plurality of logical volumes is stored on at least one of the plurality of physical storage devices, the host computer comprising:
   at least one controller to receive information from the storage system identifying, for at least one of the plurality of logical volumes, which ones of the plurality of physical storage devices store data included in the at least one of the plurality of logical volumes.

45. The host computer of claim 44, wherein the at least one controller is adapted to receive information identifying which ones of the plurality of physical storage devices store data included in each of the plurality of logical volumes.

46. The host computer of claim 44, wherein the at least one controller is adapted to receive from the storage system information concerning at least one characteristic of the ones of the plurality of physical storage devices that store data included in the at least one of the plurality of logical volumes.

47. The host computer of claim 46, wherein the computer system implements a protection scheme wherein each of the plurality of physical storage devices has an associated protection level, and wherein the at least one controller is adapted to receive from the storage system information concerning the protection levels of the ones of the plurality of physical storage devices that store data included in the at least one of the plurality of logical volumes.

48. The host computer of claim 46, wherein the computer system implements a fault tolerant scheme wherein each of the plurality of physical storage devices is associated with a fault tolerant technique, and wherein the at least one controller is adapted to receive from the storage system information concerning the fault tolerant techniques associated with the ones of the plurality of physical storage devices that store data included in the at least one of the plurality of logical volumes.

49. The host computer of claim 46, wherein each of the plurality of physical storage devices has a performance characteristic that impacts performance of the storage device, and wherein the at least one controller is adapted to receive from the storage system information concerning the performance characteristics of the ones of the plurality of physical storage devices that store data included in the at least one of the plurality of logical volumes.

50. The host computer of claim 44, wherein the at least one of the plurality of logical volumes includes a logical volume stored on a single one of the plurality of physical storage devices, so that the at least one controller is adapted to receive from the storage system information identifying the single one of the plurality of physical storage devices that stores data included in the logical volume.

51. The host computer of claim 44, wherein the at least one controller is adapted to receive information from the storage system identifying, for each one of the plurality of physical storage devices identified as storing data included in the at least one of the plurality of logical volumes, a location on the one of the plurality of physical storage devices wherein the data included in the at least one of the plurality of logical volumes is stored.

52. The host computer of claim 44, wherein the at least one controller is further adapted to use the information identifying which ones of the plurality of physical storage devices store data included in the at least one of the plurality of logical volumes to determine a configuration of data blocks among the at least one of the plurality of logical volumes.

53. The host computer of claim 44, wherein the at least one logical volume is divided into multiple contiguous stripes, and wherein the at least one controller is further adapted to use the information identifying which ones of the plurality of physical storage devices store data included in the at least one of the plurality of logical volumes to ensure that each pair of contiguous stripes is stored on different ones of the plurality of physical storage devices.

54. The host computer of claim 47, wherein the at least one controller is further adapted to use the information received from the storage system to ensure that the at least one of the plurality of logical volumes is stored entirely on one or more of the plurality of physical storage devices including a common protection level.

55. The host computer of claim 49, wherein the at least one controller is further adapted to use the information received from the storage system to configure the at least one of the plurality of logical volumes so that the at least one of the plurality of logical volumes is stored on ones of the plurality of physical storage devices that have common performance characteristics.

56. The host computer of claim 44, wherein the computer system includes a configuration of data blocks among the at least one of the plurality of logical volumes, and wherein the at least one controller is further adapted to use the information identifying which ones of the plurality of physical storage devices store data included in the at least one of the plurality of logical volumes to reconfigure the data blocks among the at least one of the plurality of logical volumes.

* * * * *